United States Patent
Álvarez Medina et al.

(10) Patent No.: US 8,385,908 B2
(45) Date of Patent: Feb. 26, 2013

(54) MODIFYING MOBILE NETWORK SIGNAL PROPAGATION PREDICTIONS

(75) Inventors: Eduardo Jesús Álvarez Medina, Antequera (ES); Javier Romero Garcia, Malaga (ES)

(73) Assignee: Optimi Corporation, Atlanta, GA (US)

( * ) Notice: Subject to any disclaimer, the term of this patent is extended or adjusted under 35 U.S.C. 154(b) by 696 days.

(21) Appl. No.: 12/027,524

(22) Filed: Feb. 7, 2008

(65) Prior Publication Data

US 2009/0203373 A1 Aug. 13, 2009

(51) Int. Cl.
H04W 24/00 (2009.01)
H04W 40/00 (2009.01)
(52) U.S. Cl. .......................... 455/423; 455/446
(58) Field of Classification Search ............... 455/422.1, 455/423, 446, 67.11, 67.13, 67.14, 63.1
See application file for complete search history.

(56) References Cited

U.S. PATENT DOCUMENTS

| | | | | |
|---|---|---|---|---|
| 6,161,018 | A * | 12/2000 | Reed et al. | 455/456.1 |
| 6,640,089 | B1 * | 10/2003 | Kanaan et al. | 455/67.16 |
| 6,834,180 | B1 * | 12/2004 | Marshall | 455/67.11 |
| 7,203,489 | B2 * | 4/2007 | Saunders | 455/423 |
| 2004/0185786 | A1 * | 9/2004 | Mirbaha et al. | 455/67.11 |

FOREIGN PATENT DOCUMENTS

| | | |
|---|---|---|
| EP | 1 098 546 A2 | 5/2001 |
| WO | WO 02/073997 al | 9/2002 |
| WO | WO 2005/069666 A1 | 7/2005 |

OTHER PUBLICATIONS

Extended European Search Report dated Jul. 8, 2010 in European Application No. 08253199.7; 7 pages.
"Timing Advance" Wikipedia [online][retrieved on Jul. 8, 2011] retrieved from: http://en.wikipedia.org/wiki/Timing_advance , pp. 1-2.

* cited by examiner

*Primary Examiner* — Kent Chang
*Assistant Examiner* — Scott Au
(74) *Attorney, Agent, or Firm* — Hope Baldauff Hartman, LLC

(57) ABSTRACT

Technologies are provided herein for modifying mobile network signal propagation predictions. According to embodiments, signal characteristics are received from a network management system. The signal characteristics correspond to signals propagating in a predetermined portion of a mobile telephone network. An initial signal propagation prediction that corresponds to the predetermined portion of the mobile telephone network is also received. The initial signal propagation prediction is modified based on the received signal characteristics to produce a more accurate signal propagation prediction.

14 Claims, 11 Drawing Sheets

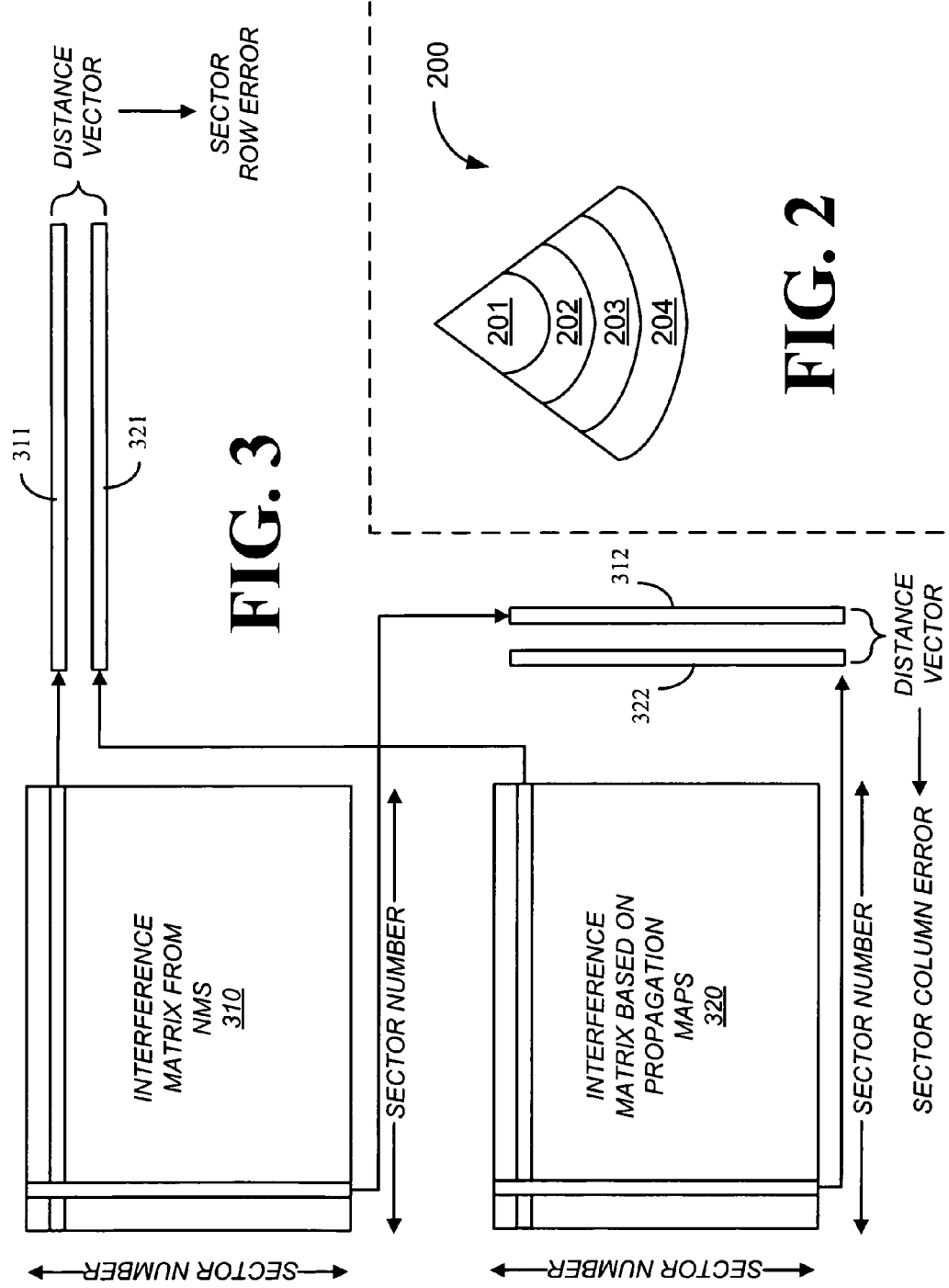

| SECTOR I | K1 = -2 | K1 = -1 | K1 = 0 | K1 = 1 | K1 = 2 |
|---|---|---|---|---|---|
| K2 = -3 | ERROR 1 | ERROR 2 | ERROR 3 | ERROR 4 | ERROR 5 |
| K2 = -2 | ERROR 6 | ERROR 7 | ERROR 8 | ERROR 9 | ERROR 10 |
| K2 = -1 | ERROR 11 | ERROR 12 | ERROR 13 | ERROR 14 | ERROR 15 |
| K2 = 0 | ERROR 16 | ERROR 17 | ERROR 18 | ERROR 19 | ERROR 20 |
| K2 = 1 | ERROR 21 | ERROR 22 | ERROR 23 | REL. MIN. ITERATION I | ERROR 25 |
| K2 = 2 | ERROR 26 | ERROR 27 | ERROR 28 | ERROR 29 | REL. MIN. ITERATION I + 1 |
| K2 = 3 | ERROR 31 | ERROR 32 | ERROR 33 | ERROR 34 | ERROR 35 |

FIG. 6

MODIFYING MOBILE NETWORK SIGNAL PROPAGATION PREDICTIONS

BACKGROUND

A wireless telephone signal experiences path loss as it propagates from a mobile telephone to a mobile network transceiver. Path loss (also called path attenuation) is the reduction in the power of an electromagnetic wave as it travels from one location to another. Path loss may be due to many effects, such as, for example, a signal being partially absorbed or deflected by trees and buildings along the signal path. Path loss is influenced by terrain contours, environment (e.g., urban vs. rural), propagation medium (dry vs. moist air), the distance between a transmitter and a receiver, and the height and location of antennas.

Propagation predictions are commonly used in radio network planning and optimization tools. In order to improve prediction accuracy, most propagation models have internal parameters that can be used to fine tune predictions to account for specific propagation conditions over a certain area. Test data is traditionally used to fine-tune propagation models based on a comparison of predicted versus measured signal strength for each location. Optimum propagation model parameters can be derived that minimize the error of the predicted signal strengths. The main disadvantage of this approach, however, is the need for extensive drive testing, which is very time-consuming and not scalable.

It is with respect to these considerations and others that the disclosure presented herein has been made.

SUMMARY

Technologies are provided herein for modifying mobile network signal propagation predictions. According to embodiments, signal characteristics are received from a network management system. The signal characteristics correspond to signals propagating in a predetermined portion of a mobile telephone network. Examples of the signal characteristics include values for received signal strength indicators, signal timing advance, and a signal interference matrix.

An initial signal propagation prediction that corresponds to the predetermined portion of the mobile telephone network is also received. The initial signal propagation prediction is modified based on the received signal characteristics to produce a more accurate signal propagation prediction. The initial signal propagation prediction may also be modified based on estimated signal characteristics corresponding to the predetermined portion of the mobile telephone network.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a schematic diagram illustrating a traffic map sector, according to exemplary embodiments;

FIG. 3 is a block diagram illustrating an example of calculating an interference matrix error metric applicable to individual sectors in one embodiment;

FIG. 6 is a table illustrating an iterative method for determining optimum correction factors for the solution area shown in FIG. 5, according to exemplary embodiments;

DETAILED DESCRIPTION

Figure 1A:
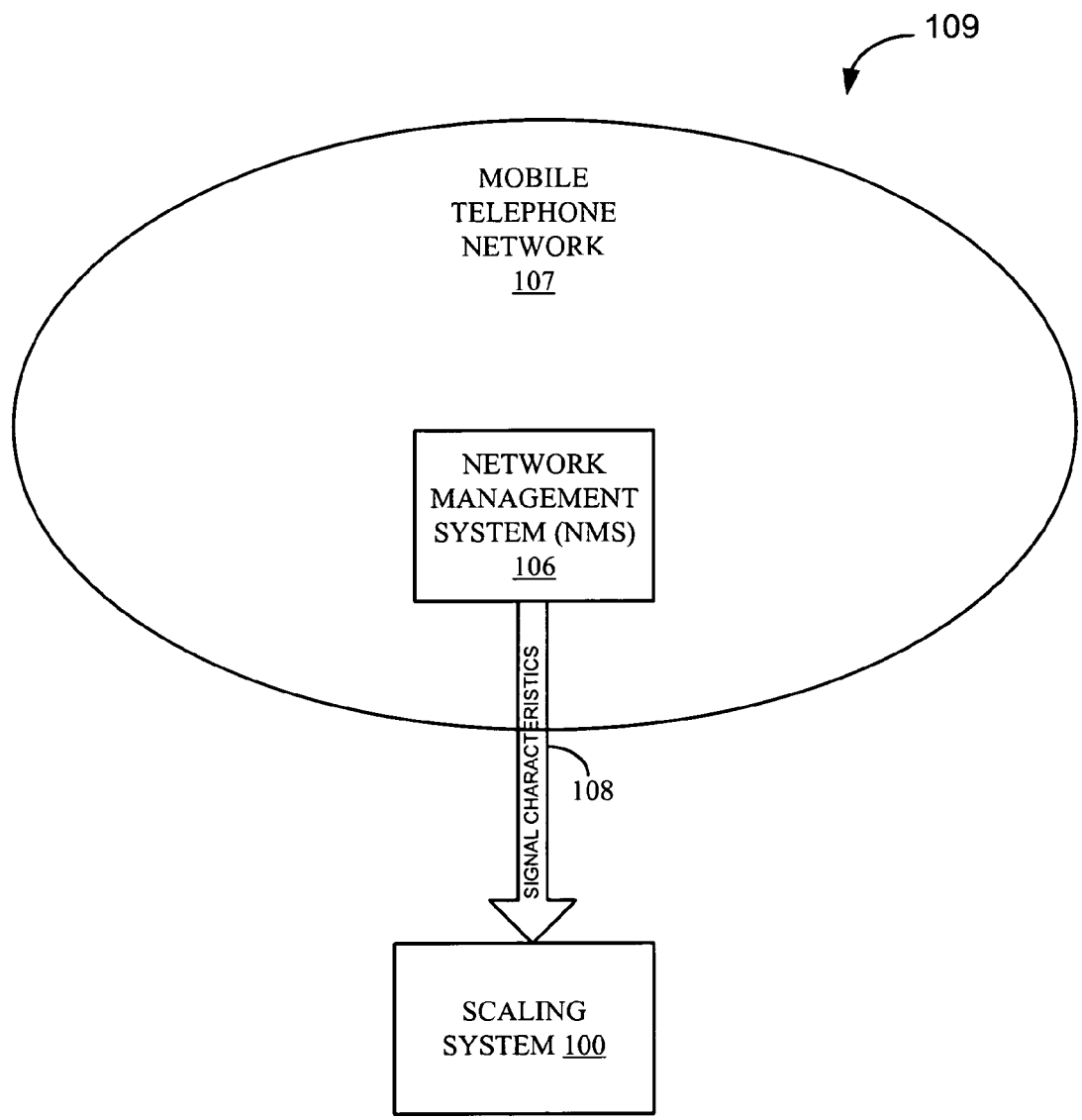
FIG. 1A is a block diagram illustrating a communication system, according to exemplary embodiments.

The following detailed description is directed to technologies for modifying mobile network signal propagation predictions. In the following detailed description, references are made to the accompanying drawings that form a part hereof, and which are shown by way of exemplary embodiments and implementations.

Note that although the subject matter presented herein has been described in conjunction with one or more particular embodiments and implementations, it is to be understood that the embodiments are not necessarily limited to the specific structure, configuration, or functionality described herein. Rather, the specific structure, configuration, and functionality described herein are disclosed as examples. Various modifications and changes may be made to the subject matter described herein without following the exemplary embodiments and applications illustrated and described, and without departing from the true spirit and scope of the embodiments.

Referring now to the FIGURES, technologies for modifying mobile network signal propagation predictions will be described. Path loss normally includes propagation losses such as, for example, losses due to absorption and diffraction of the electromagnetic waves. Furthermore, a signal radiated by a transmitter may travel along many and different paths to a receiver. This propagation of a signal is called multipath. Multipath can either increase or decrease received signal strength, depending on whether the individual multipath wave fronts interfere constructively or destructively. The total power of interfering waves may vary quickly as a function of location resulting in fast fades which are very sensitive to receiver position.

Path loss is usually expressed in dB. In its simplest form, the path loss can be calculated using the formula $L = 10n \log_{10}(d) + C$, where L is the path loss in decibels, n is the path loss exponent, d is the distance between the transmitter and the receiver (usually measured in meters), and C is a constant which accounts for system losses. Calculation of the path loss is usually called propagation prediction. Exact propagation predictions are possible only for simple cases. For practical cases the propagation predications are calculated using a variety of methods. Among the most commonly used methods for propagation predictions are COST-231, Okumura-Hata, and W.C.Y.Lee.

Propagation models having optimized model parameters can be used to provide more accurate signal strength predictions. Radio measurement information reported by mobile network stations can be used for propagation model tuning. For example, measurement reports are received and processed by a mobile network, which computes a set of radio statistics that are made available for optimization and troubleshooting purposes in general. Using processed statistics from a network management system (NMS) instead of test measurements substantially reduces the amount of data to be managed and reduces or eliminates the need for special features or probes for collecting mobile network test measurement data and for manual data collection (e.g., drive tests).

FIG. 1A is a block diagram illustrating a communication system 109, according to exemplary embodiments. The communication system 109 includes a network management system (NMS) 106 and a scaling system 100. The NMS 106 is a tool for monitoring and managing the mobile telephone network 107. The NMS 106 provides the scaling system 100 with signal characteristics 108 corresponding to mobile telephone communications within the mobile telephone network 107. The signal characteristics 108 may include, for example, values for received signal strength indicators, signal timing advance, and/or a signal interference matrix. An interference matrix includes rows and columns of values that indicate interference between mobile phones or mobile phone sectors. A timing advance value is based on a length of time that a signal takes to travel between a mobile phone and a base station. A timing advance distribution per sector includes timing advance values for various sectors or portions of sectors.

The scaling system 100 uses the signal characteristics 108 to revise signal propagation predications for the mobile telephone network 107. For example, the scaling system 100 may compare the signal characteristics 108 with corresponding estimated signal characteristics to determine one or more error factors. Correction factors for scaling propagation predictions may then be determined based on the error factors. For example, correction factors corresponding to a minimum error factor may be selected. Optimum correction factors per sector can be determined using an iterative algorithm. For example, after changing predictions for each sector, the dominance areas, prediction statistics, and prediction correction factors can be re-calculated.

According to exemplary embodiments, signal propagation predictions for respective locations within the mobile telephone network are corrected based on one or more correction factors that account for the distance between a mobile telephone and a corresponding base station, the macro-cell propagation model to be optimized, and the clutter type of the location. These correction factors, also referred to herein as path loss correction factors, can be expressed in mathematical terms. Path loss correction factors can be determined for each sector so that an error term corresponding to predicted vs. measured radio performance metrics is minimized.

Figure 1B:
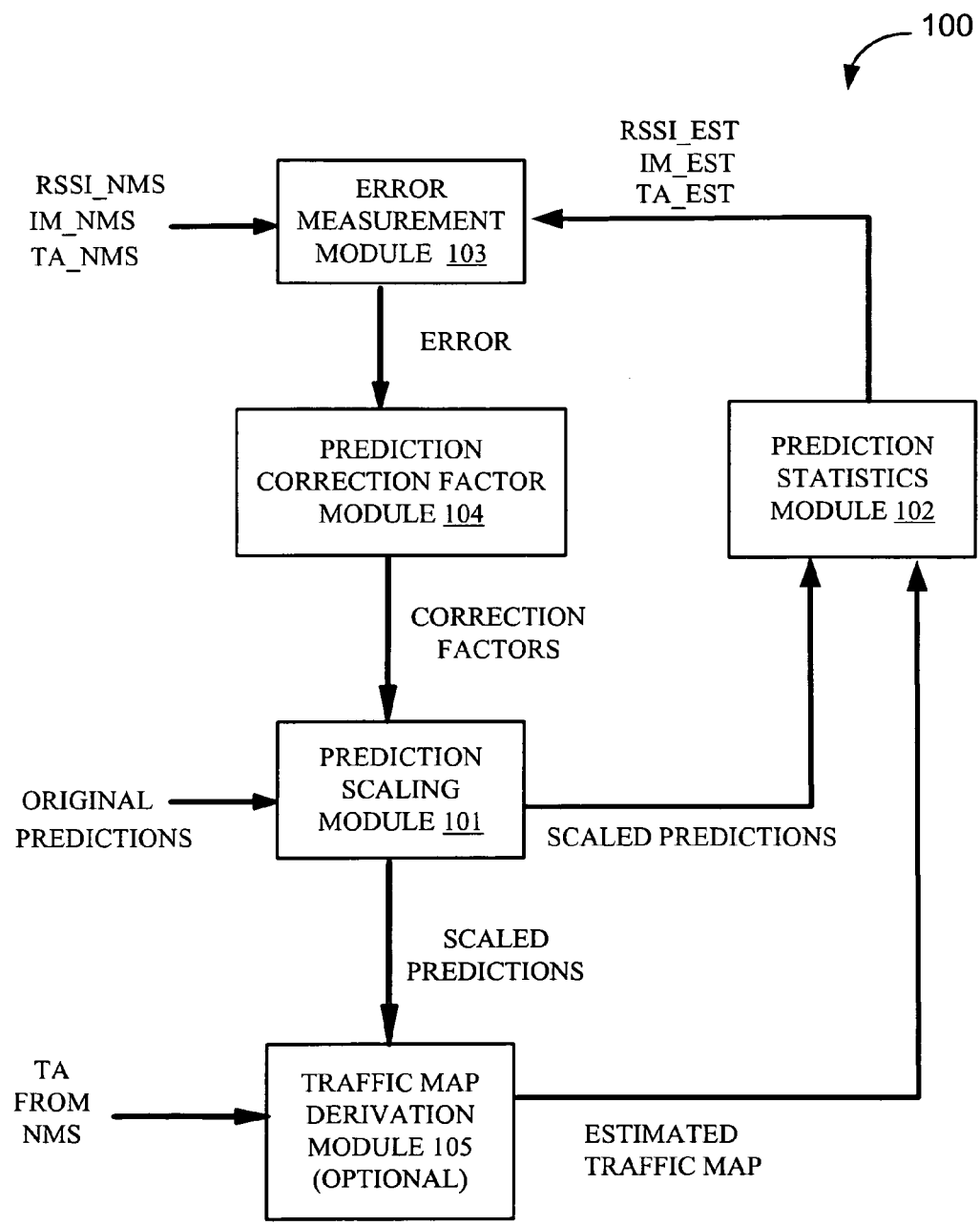
FIG. 1B is a block diagram illustrating a scaling system for propagation prediction scaling in one embodiment.

FIG. 1B is a block diagram illustrating a scaling system 100 for propagation prediction scaling. The scaling system 100 includes a prediction scaling module 101, a prediction statistics module 102, an error measurement module 103, and a prediction correction factor module 104. The prediction scaling module 101 computes new scaled predictions based on correction factors received from the prediction correction factor module 104 and on original propagation predictions. According to exemplary embodiments, the prediction scaling module 101 uses the following formula: scaled predictions (azimuth, distance)=original predictions (azimuth, distance)+K1+K2*$\log_{10}$ (distance), where K1 and K2 are correction factors that can have positive or negative values. K1 is a correction for intercept distance attenuation and K2 is a correction prediction attenuation slope with distance. Alternative propagation scaling formulas can also be utilized in other embodiments.

The prediction statistics module 102 computes estimates for received signal strength indicator (RSSI) levels, an interference matrix (IM), and time advance (TA) values based on the scaled predictions from the prediction scaling module 101 and on a traffic map. A traffic map identifies the concentration or intensity of mobile phone signals in corresponding geographical areas. The traffic map received by the prediction statistics module 102 may be an actual traffic map or an estimated traffic map. An optional traffic map derivation module 105 may be used to provide an estimated traffic map to the prediction statistics module 102. The predication statistics module provides the estimates for RSSI, IM, and TA values to the error measurement module 103.

The error measurement module 103 computes an error metric based on a comparison of estimates for RSSI, IM and TA values with corresponding values received from the NMS. An example of IM error metric applicable to individual sectors is illustrated in FIG. 3. The error measurement module 103 provides the error metric to the prediction correction factor module 104 which uses the error metric to select new K1 and K2 values. The correction factor module 104 then provides the new K1 and K2 value to the prediction scaling module 101.

Since network management system statistics are associated with sectors, it is also possible to correct predictions depending on which sector dominance area the pixels to be scaled are located in. In this case, the prediction correction can be, for example, K1 (area)+K2 (area)*log (distance). In other words, each predetermined area would have corresponding correction variables K1 and K2. This type of correction allows more flexibility in matching RSSI and IM predictions but may create prediction discontinuities between different dominance areas. According to exemplary embodiments, the prediction statistics module 102 computes the new sector dominance areas after prediction scaling. An RSSI probability distribution per pixel is computed on each sector dominance area. The distribution may be calculated over the same RSSI intervals used by the network management system.

An IM is computed based on average signal-to-interference ratio, probability of signal-to-interference ratio falling below a certain threshold, or a similar metric. This measurement may use the same threshold definitions used in the network management system. Time advance probability distribution is computed on each sector dominance area as the percentage of pixels at the different distance intervals from the BTS. The distance intervals for time advance distribution may be fixed and mobile technology dependant.

FIG. 2 is a schematic diagram illustrating a traffic map sector 200, according to exemplary embodiments. The traffic map sector 200 includes four time advance zones: zone 201, zone 202, zone 203, and zone 204. The traffic map value corresponding to each zone is equal to the time advance value for the zone divided by the area of the zone. For example, the traffic map value for zone 202 is equal to the time advance value for zone 202 divided by the area of zone 202.

A traffic map may be considered when computing prediction statistics. A traffic map is often unknown and can be a significant source of uncertainty. The traffic map derivation module 105 can be used to provide an estimated traffic map based on time advance distribution information provided by the NMS and on scaled predictions provided by the prediction scaling module 101.

The units for calculating traffic map intensity may be, for example, Erlangs. An Erlang is a dimensionless unit used in telephony as a statistical measure of the volume of telecommunication traffic. A time advance distribution defines an amount of traffic at different distance intervals from a base transceiver station (BTS). In Global System for Mobile communications (GSM) systems, distance intervals of, for example, 550 meters may be used. A traffic map can be derived by dividing each NMS time advance value by the number of pixels in the corresponding time advance area.

FIG. 3 is a block diagram illustrating an example of calculating an IM error metric applicable to individual sectors. The error measurement module 103 compares the predicted RSSI, IM and time advance values with corresponding values provided by the NMS. For example, rows and columns from a first IM 310 provided by the NMS may be compared with corresponding rows and columns from a second IM 320 that is based on predicted values. An IM row error represents the error in the interference generated to the rest of the sectors by a particular sector. An IM column error represents the error of the interference suffered by a particular sector from the rest of the sectors. As an example, a row 311 from the first IM 310 is compared with a corresponding row 321 from the second IM 320 to determine a sector row error. Similarly, a column 312 from the first IM 310 is compared with a corresponding column 322 from the second IM 320 to determine a sector column error. RSSI and TA errors per sector may also be computed based on comparisons of predicted RSSI values and RSSI values received from the NMS. A global error metric can be computed as a weighted combination of RSSI, IM and TA errors as illustrated, for example, in FIG. 4.

Figure 4:
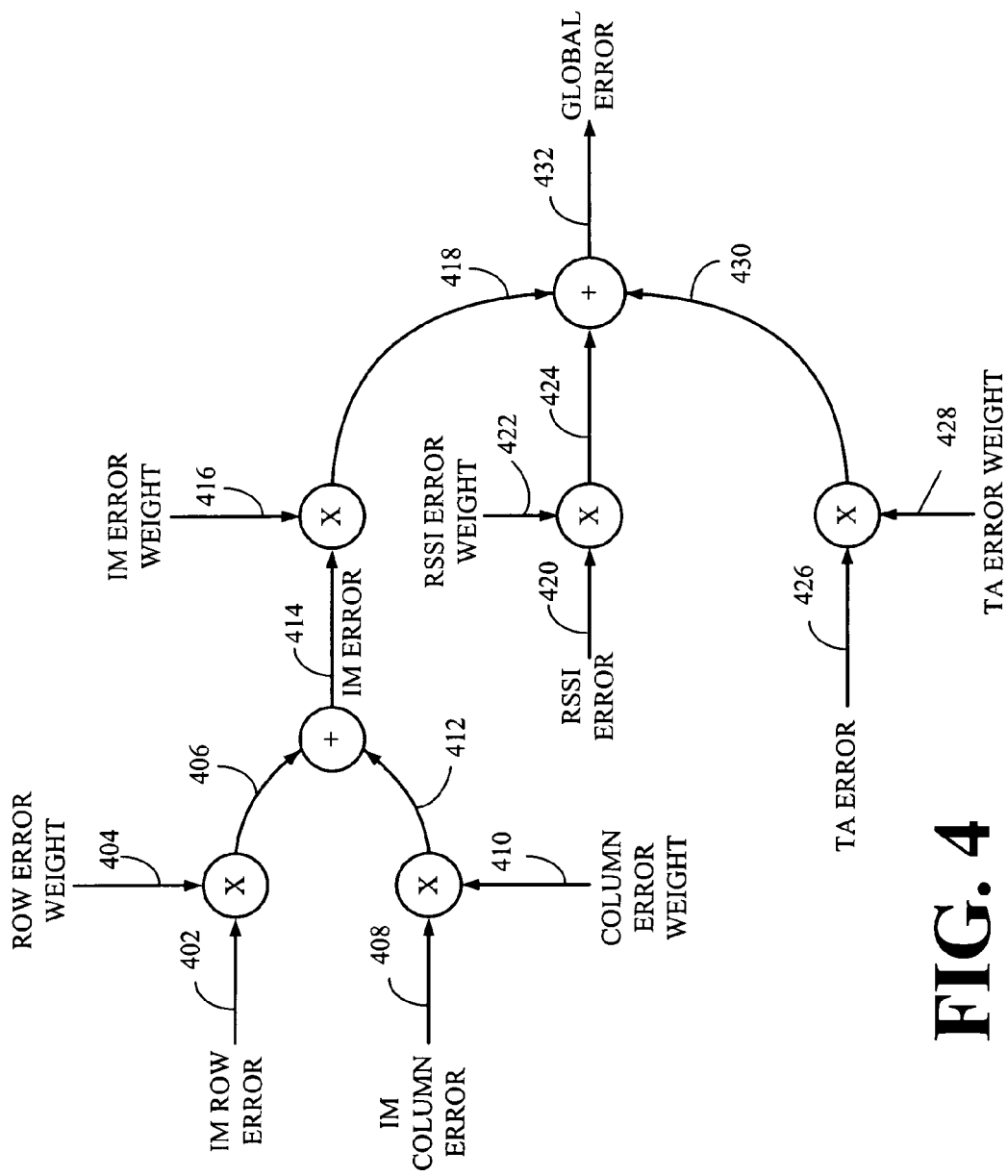
FIG. 4 is a flow diagram illustrating an example of global error calculation, according to exemplary embodiments.

FIG. 4 is a flow diagram illustrating an example of global error calculation, according to exemplary embodiments. A global error metric may be defined as a weighted addition of RSSI, IM and time advance errors. By setting different weights it is possible to obtain a better matching of some statistics at the expense of the others. In the example shown in FIG. 4, an IM row error 402 is multiplied by a row error weight 404 to determine a weighted IM row error 406. The IM column error 408 is multiplied by a column error weight 410 to determine a weighted IM column error 412. The weighted IM row error 406 is added to the weighted IM column error 412 to determine the IM error 414. The IM error 414 is multiplied by an IM error weight 416 to determine a weighted IM error 418. The RSSI error 420 is multiplied by an RSSI error weight 422 to determine a weighted RSSI error 424. A TA error 426 is multiplied by a TA error weight 428 to determine a weighted TA error 430. The weighted IM error 418, the weighted RSSI error 424, and the weighted TA error 430 are then summed to determine the global error 432.

Figure 5:
FIG. 5 is a table illustrating a solution area used to determine a correction factor, according to exemplary embodiments.

FIG. 5 is a table illustrating a solution area 500, according to exemplary embodiments. As mentioned above, a correction factor can be equal to K1+K2*log (distance). The prediction correction factor module 104 searches K1 and K2 values per sector that minimize the global error as measured by the error measurement module 103. Searching systematically for the optimum K1 and K2 values thorough all possible sectors may or may not be practical, depending on computing capacity. For example for a 300 sector network and fifteen possible values for K1 and K2, the number of evaluations is equal to 47,500.

FIG. 6 is a table illustrating an iterative method for determining optimum K1 and K2 values for the solution area 500 shown in FIG. 5, according to exemplary embodiments. For each sector, a two-dimensional sliding window 602 is used. An algorithm iterates over all sectors following, for example, either a random or a predetermined order. Optimum K1 and K2 values inside the sliding window 602 are found by systematically evaluating the error for each pair of K1 and K2 values. The sliding window 602 for each sector is updated after each iteration so that the center of the window is the local minimum of the error. After a number of iterations or when the sliding window cannot be moved within the table so as to be centered on a local minimum, the process stops.

Figure 7:
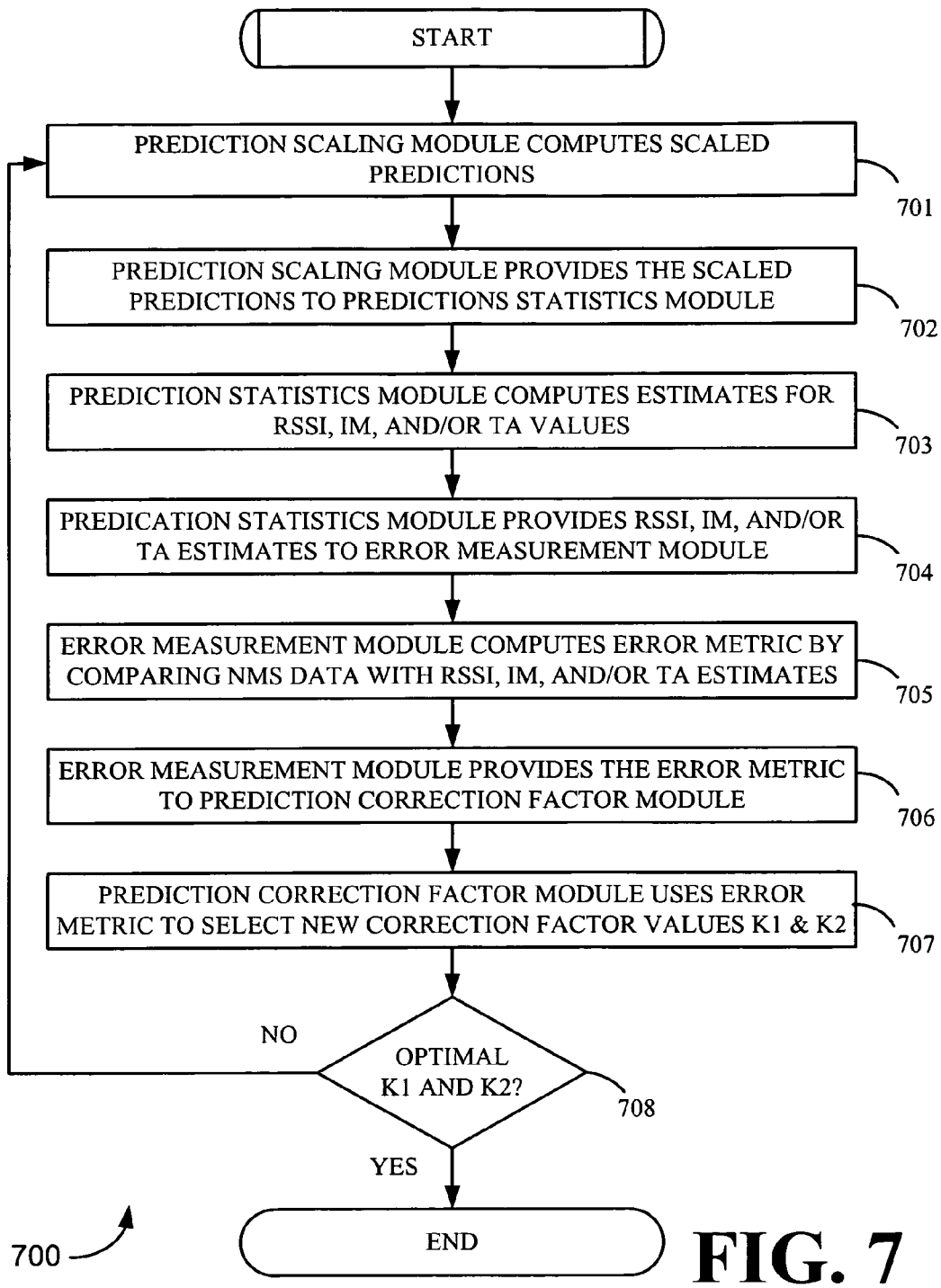
FIG. 7 is a flow chart illustrating a method for scaling predictions for signal propagation, in accordance with exemplary embodiments.

FIG. 7 is a flow chart illustrating a routine 700 for scaling predictions for signal propagation, in accordance with exemplary embodiments. As implemented at operation 701, the prediction scaling module 101 computes scaled predictions for signal propagation based on correction factors received from the prediction correction factor module 104 and on original propagation predictions. According to exemplary embodiments, the prediction scaling module 101 may use the following formula: scaled predictions (azimuth, distance)= original predictions (azimuth, distance)+K1+K2*$\log_{10}$ (distance), where K1 and K2 are correction factors that can have positive or negative values.

Note that alternative propagation scaling formulas may be used. Since network management system statistics are associated with sectors, it is also possible to correct predictions depending on which sector dominance area the pixels to be scaled are located in. In this case, the prediction correction can be, for example, K1 (area)+K2 (area)*log (distance).

As implemented at operation 702, the prediction scaling module 101 provides the scaled predictions for signal propagation to the prediction statistics module 102. Then, as implemented at operation 703, the prediction statistics module 102 computes estimates for received signal strength indicator (RSSI), interference matrix (IM), and/or timing advance (TA) values based on the scaled predictions from the prediction scaling module 101 and on a traffic map. The traffic map received by the prediction statistics module 102 may be an actual traffic map or an estimated traffic map. An optional traffic map derivation module 105 may be used to provide an estimated traffic map to the prediction statistics module 102.

As implemented at operation 704, the prediction statistics module provides the estimates for RSSI, IM, and TA values to the error measurement module 103. The error measurement module 103 then computes an error metric based on a comparison of estimates for RSSI, IM and/or TA values with corresponding values received from the NMS, as implemented at operation 705. The error metric may be based on a weighted combination of RSSI, IM, and/or TA errors.

The error measurement module then provides the error metric to the prediction correction factor module 104, as implemented at operation 706. The prediction correction factor module 104 uses an error metric to select new correction factor values K1 and K2, as implemented at operation 707. A determination is then made as to whether optimal K1 and K2 scaling factors have been identified, as implemented at operation 708. If optimal K1 and K2 scaling factors have been identified, then the routine 700 ends. If optimal K1 and K2 scaling factors have not been identified, then the method 700 returns to operation 701, where the prediction scaling module 101 computes revised scaled predictions based on the new K1 and K2 values.

Figure 8:
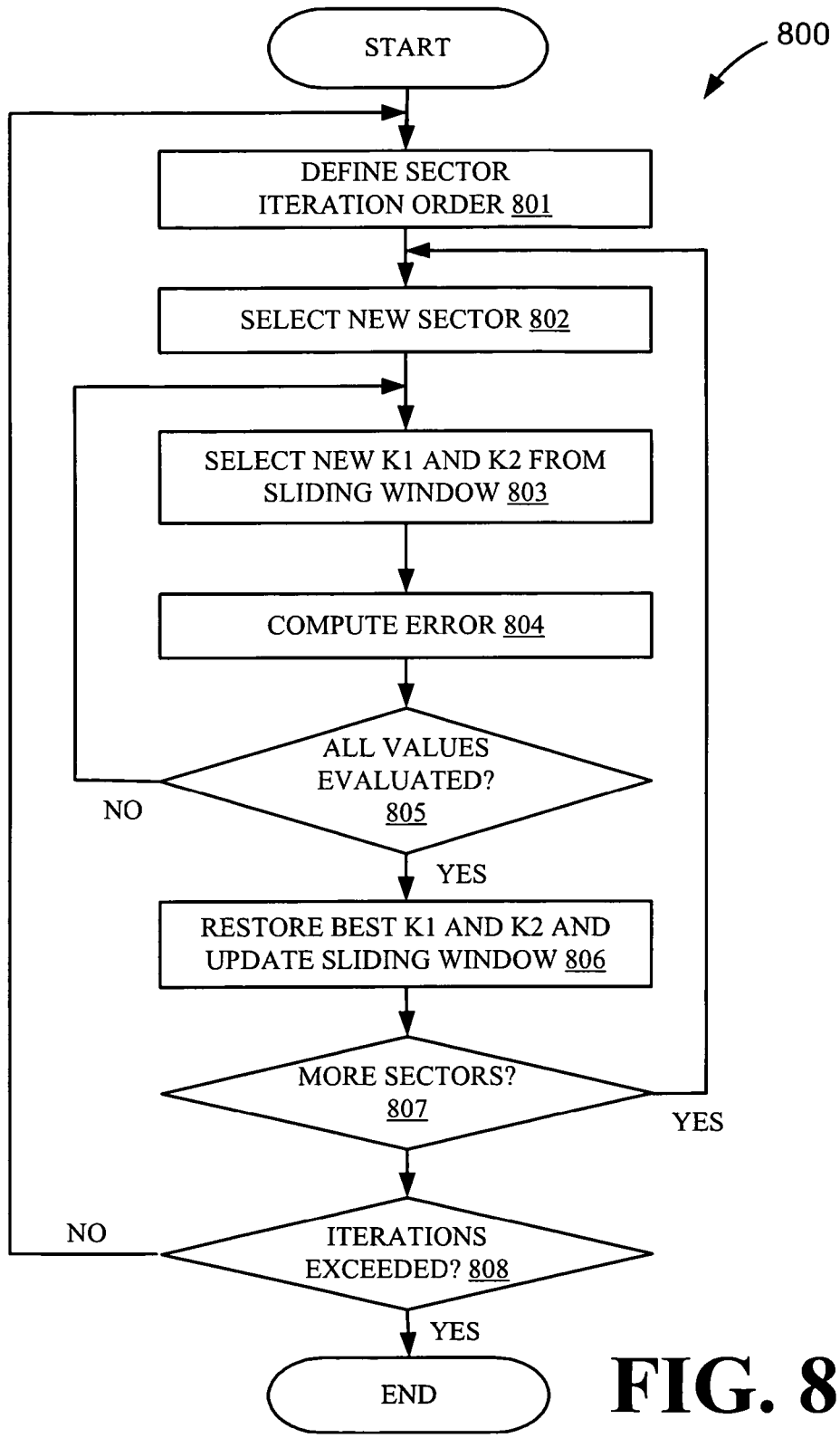
FIG. 8 is a flow chart illustrating a method for determining optimum correction factors.

FIG. 8 is a flow chart illustrating an operation 800 for determining optimum correction factors. As implemented at operation 801, a sector iteration order is defined. A new sector is then selected, as implemented at operation 802. New K1 and K2 values are selected from a sliding window, as implemented at operation 803. An example of a sliding window is shown in FIG. 6. An error corresponding to the selected K1 and K2 values is then computed, as implemented at operation 804. A determination is then made at operation 805 as to whether all K1 and K2 values in the sliding window have been evaluated, as implemented at operation 805.

If it is determined that not all K1 and K2 values in the sliding window have been evaluated, then the method returns to operation 803 where new K1 and K2 values are selected from the sliding window. However, if it is determined that all K1 and K2 values in the sliding window have been evaluated, then the method proceeds to operation 806 where the best K1 and K2 values are restored, and the sliding window is updated. A determination is then made as to whether there are more sectors to be evaluated, as implemented at operation 807.

If a determination is made that there are more sectors to be evaluated, then the routine 800 returns to operation 802 where a new sector is selected. If, however, a determination is made at operation 808 that there are no more sectors to be evaluated, then a determination is made as whether a total number of iterations has been exceeded. If it is determined that a total number of iterations has not been exceeded, then the routine 800 returns to operation 801, where a sector iteration order is defined. If, however, it is determined that a total number of iterations has been exceeded, then the routine 800 is terminated.

In cases where the predictions are inaccurate and because prediction correction is based on a statistical matching, some sectors may end up with unrealistic predictions and/or dominance area size. In order to avoid this problem, the same correction factor may initially be applied to all sectors in a network. After a certain time period, the same correction factor may then be applied to sectors belonging to a common site. Eventually, correction factors may be applied individually to each sector such that each sector may have a different correction factor.

Figure 9:
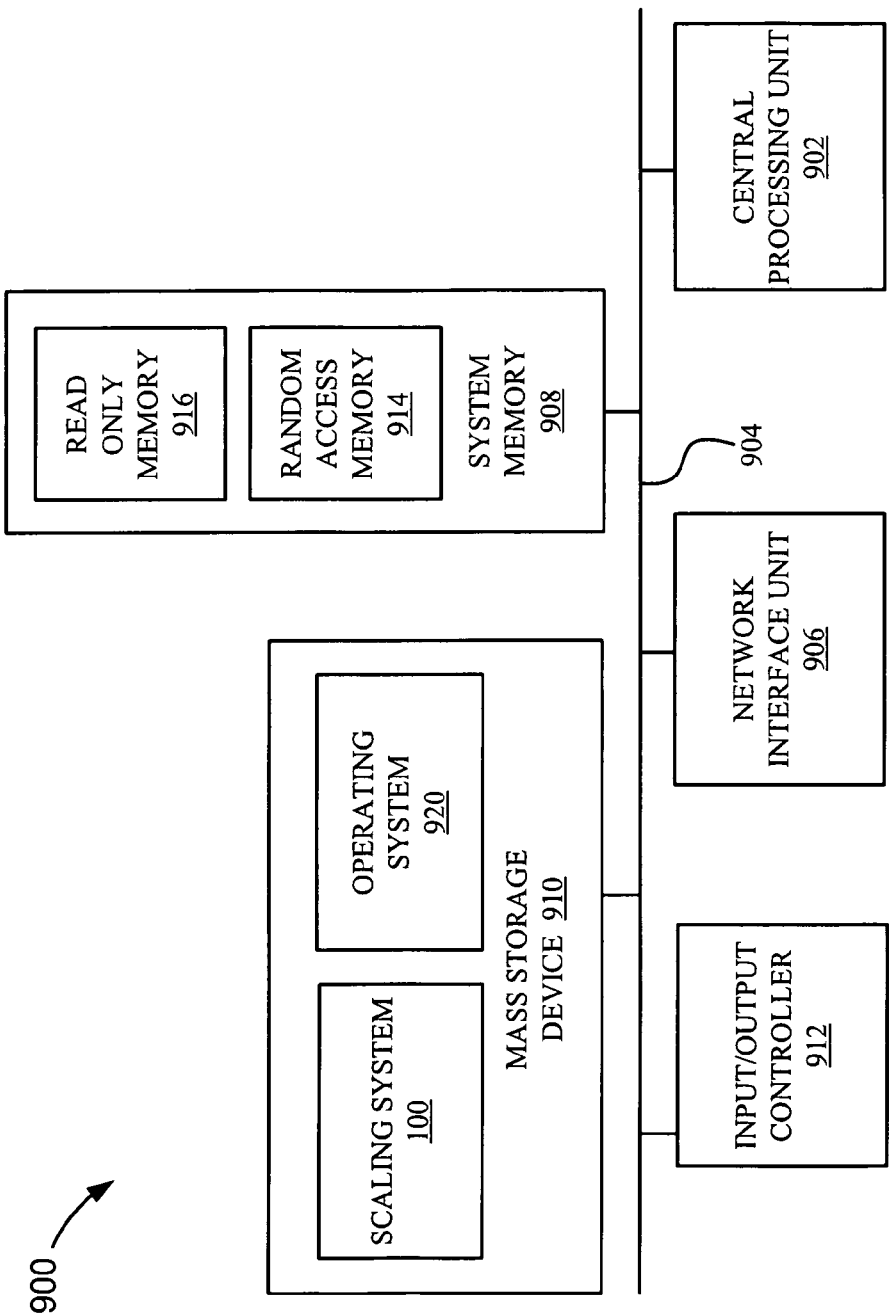
FIG. 9 is a block diagram illustrating a computer capable of implementing aspects of the technologies presented herein, in accordance with exemplary embodiments.

FIG. 9 is a block diagram illustrating a computer 900 capable of executing the software components presented herein. The computer 900 includes a central processing unit (CPU) 902, a system memory 908, including a random access memory (RAM) 914 and a read-only memory (ROM) 916, and a system bus 904 that couples the memory 908 to the CPU 902. A basic input/output system containing the basic routines that help to transfer information between elements within the computer 900, such as during startup, is stored in the ROM 916. The computer 900 further includes a mass storage device 910 for storing an operating system 920 and other program modules, which will be described in greater detail below.

The mass storage device 910 is connected to the CPU 902 through a mass storage controller (not shown) connected to the bus 904. The mass storage device 910 and its associated computer-readable media provide non-volatile storage for the computer 900. Although the description of computer-readable media contained herein refers to a mass storage device, such as a hard disk or CD-ROM drive, it should be appreciated by those skilled in the art that computer-readable media can be any available media that can be accessed by the computer 900.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 900.

The computer 900 may connect to a network through a network interface unit 906 connected to the bus 904. It should be appreciated that the network interface unit 906 may also be utilized to connect to other types of networks and remote computer systems. The computer 900 may also include an input/output controller 912 for receiving and processing input from a number of other devices, including a keyboard, mouse, or electronic stylus (not shown in FIG. 9). Similarly, an input/output controller may provide output to a display screen, a printer, or other type of output device (also not shown in FIG. 9).

As mentioned briefly above, a number of program modules and data files may be stored in the mass storage device 910 and RAM 914 of the computer 900, including the operating system 920 suitable for controlling the operation of the computer 900. The mass storage device 910 and RAM 914 may also store one or more program modules. In particular, the mass storage device 910 and the RAM 914 may store a scaling system 100. The scaling system 100 may include a prediction scaling module 101, a prediction statistics module 102, an error measurement module 103, and a prediction correction factor module 104, as shown in FIG. 1. These modules 101-104 may be configured to operate as illustrated, for example, in FIG. 7. Other program modules may also be stored in the mass storage device 910 and utilized by the computer 900.

It should be appreciated that, in the extreme case where the propagation correction factor is different for each pixel, it is possible to scale individual RSSI pixel values without affecting to other pixels. This case is, therefore, referred to as "pixel scaling" instead of "propagation model scaling" as described above. Virtually any OSS counter, like RSSI and IM probability distribution, may be matched by performing pixel scaling. In particular, matching may be performed by defining the RSSI values per pixel that result in a match with OSS statistics.

The OSS statistics are known inside the dominance area of the strongest server. Consider, for example, a dominance area of N pixels. There are many different ways to assign N RSSI values to N pixels. According to embodiments, this may be done following different algorithms and, depending on the information available, based on a most probably location principle. For example, lowest scaled RSSI values may be assigned to pixels with lowest predicted RSSI values.

Some OSS statistics are not a direct measure of RSSI values, but are influenced by them, for example, C/I distributions in GSM systems or Ec/Io distributions in UMTS systems. In those cases, the N values that match the C/I or Ec/Io distribution are identified and, in a second phase, the RSSI pixel values that result in the N scaled C/I or Ec/Io pixel values are located.

One example of pixel scaling for GSM systems is described below. In this embodiment, the objective is to identify RSSI pixel values for serving cells and the interferers that match RxLEV and C/I distributions reported by the OSS. OSS statistics are computed in a dominance area. Therefore, the number of RSSI and C/I samples coincides with the number of pixels of the dominance area. For a dominance area with N pixels the following samples are found: N RSSI values of serving cells that match with a serving cell level distribution; N C/I values that match with a C/I distribution of an interferer 1; N C/I values that match with a C/I distribution of an interferer 2; N C/I values that match with a C/I distribution of an interferer 3; and so on. Algorithms for finding a number of samples that match optimally with a specific probability distribution are known to those in the art.

According to embodiments, the N RSSI values may then be assigned to pixels in the dominance area. The lowest RSSI value is assigned to the pixel with the lowest predicted RSSI values, which is considered to be scaled. This process is repeated until all N values have been assigned to all available pixels (all pixels are scaled). While scaling RSSI values of the serving cell, all interferers are scaled up or down in order to keep C/I per pixel unchanged. A similar process may be applied to the N C/I values for each interferer. In this case, the assigning criteria is predicted C/I values. After C/I is scaled, the RSSI value for an interferer can be found as RSSIinterferer [dBm]=RSSIserving [dBm]−C/I at each pixel.

Figure 10:
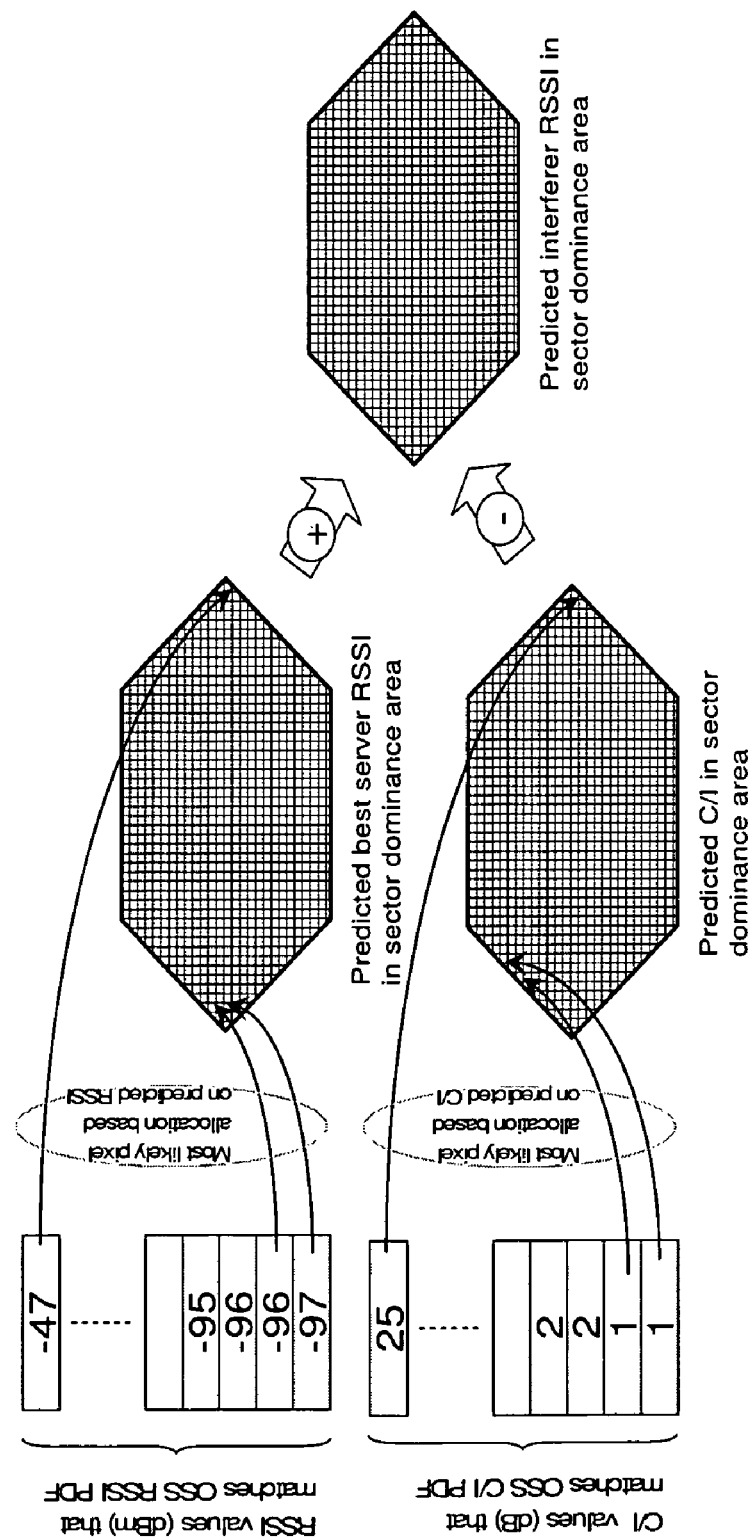
FIG. 10 illustrates a pixel scaling process for best server RSSI and one of the interferers in one embodiment.
Figure 11:
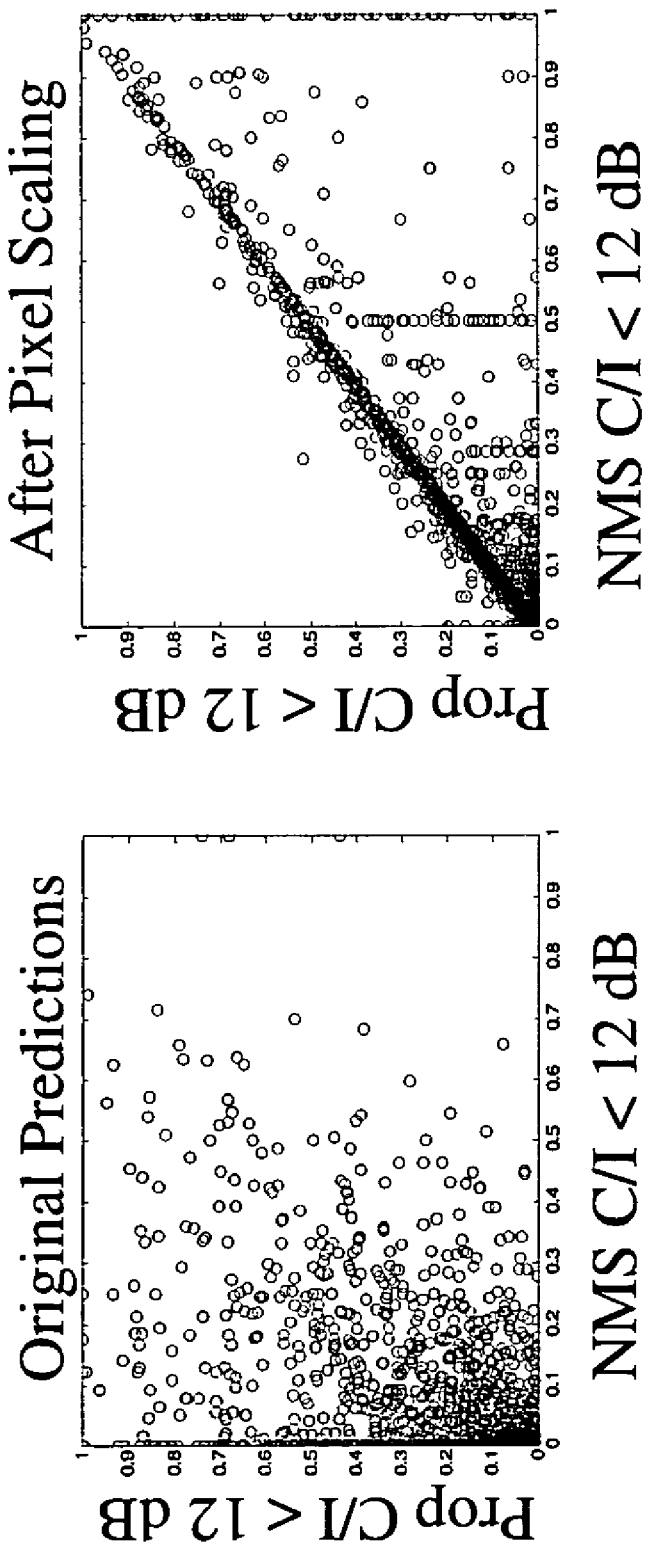
FIG. 11 shows a comparison of OSS C/I statistics vs. predicted C/I before and after pixel scaling is depicted according to one embodiment.

The pixel scaling process for best server RSSI and one of the interferers is depicted in FIG. 10. A comparison of OSS C/I statistics vs. predicted C/I before and after pixel scaling is depicted in FIG. 11. Note that because of the limited number of pixels in the dominance area, the matching is not perfect for some interferer-victims relationships.

It should also be appreciated that, after implementing antenna changes in a real network, the OSS statistics will change. The estimation of this change is important for wireless network optimization. One way to accomplish this is to re-compute new predictions after antenna changes with the pixel scaled path-loss.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims. Various modifications and changes may be made to the subject matter described herein without following the example embodiments and applications illustrated and described, and without departing from the true spirit and scope of the embodiments, which is set forth in the following claims.

What is claimed is:

1. A computer-implemented method for modifying mobile network signal propagation predictions, comprising:
receiving from a network management system signal characteristics comprising at least a first signal characteristic value and a second signal characteristic value, wherein each signal characteristic value is derived from separate measurements from a plurality of mobile network stations corresponding to signals propagating in a predetermined portion of a mobile telephone network comprising a sector, and wherein the signal characteristics include at least two of received signal strength indicator values, an interference matrix comprising a plurality of interference values each representing interference of the sector with a respective plurality of other sectors of the mobile telephone network, and timing advance values;
receiving a first signal propagation prediction corresponding to the predetermined portion of the mobile telephone network;
modifying the first signal propagation prediction to produce a second signal propagation prediction using the signal characteristics;
using the second signal propagation prediction and a traffic map corresponding to the portion of the mobile telephone network to produce estimated signal characteristics corresponding to the predetermined portion of the mobile telephone network; and
comparing the estimated signal characteristics to the signal characteristics received from the network management system.

2. The method of claim 1, wherein the traffic map is based on timing advance values received from the network management system.

3. The method of claim 1, wherein comparing the estimated signal characteristics to the signal characteristics comprises comparing at least two of received signal strength indicator values, interference matrices, and time advance values.

4. The method of claim 1, further comprising generating an error metric responsive to comparing the estimated signal characteristics to the signal characteristics.

5. The method of claim 4, further comprising computing a correction factor based on the error metric, wherein the correction factor is used to modify the first signal propagation prediction to produce the second signal propagation prediction.

6. The method of claim 5, wherein the correction factor includes a constant portion and a variable portion, the variable portion being responsive to a distance between a transmitter and a receiver of a corresponding mobile telephone signal.

7. The method of claim 5, wherein a plurality of correction factors are computed for a plurality of respective sectors of the mobile telephone network, the plurality of correction factors being used to modify signal propagation predictions for the plurality of respective sectors.

8. A system for modifying mobile network signal propagation predictions, the system comprising:
a processor; and
a memory comprising instructions configured to enable the processor to
receive from a network management system signal characteristics comprising at least a first signal characteristic value and a second signal characteristic value, wherein each signal characteristic value is derived from separate measurements from a plurality of mobile network stations, the signal characteristics corresponding to signals propagating in a predetermined portion comprising a sector of a mobile telephone network and wherein the signal characteristics include at least two of received signal strength indicator values, an interference matrix comprising a plurality of interference values each representing interference of the sector with a respective plurality of other sectors of the mobile telephone network, and timing advance values,
receive a first signal propagation prediction corresponding to the predetermined portion of the mobile telephone network,
modify the first signal propagation prediction to produce a second signal propagation prediction using the signal characteristics,
use the second signal propagation prediction and a traffic map corresponding to the portion of the mobile telephone network to produce estimated signal characteristics corresponding to the predetermined portion of the mobile telephone network, and compare the estimated signal characteristics to the signal characteristics received from the network management system.

9. The system of claim 8, wherein the traffic map is based on the timing advance values received from the network management system.

10. The system of claim 8, wherein comparing the estimated signal characteristics to the signal characteristics comprises comparing at least two of received signal strength indicator values, interference matrices, and time advance values.

11. The system of claim 8, wherein the instructions are further configured to enable the processor to generate an error metric responsive to comparing the estimated signal characteristics to the signal characteristics.

12. The system of claim 11, wherein the instructions are further configured to enable the processor to compute a correction factor based on the error metric, and wherein the correction factor is used to modify the first signal propagation prediction to produce the second signal propagation prediction.

13. The system of claim 12, wherein the correction factor includes a constant portion and a variable portion, the variable portion being responsive to a distance between a transmitter and a receiver of a corresponding mobile telephone signal.

14. A computer readable storage medium for modifying mobile network signal propagation predictions, comprising:
   instructions, which when executed by a computer, cause the computer to
   receive from a network management system signal characteristics comprising at least a first signal characteristic value and a second signal characteristic value, wherein each signal characteristic value is derived from separate measurements from a plurality of mobile network stations, the first signal characteristics corresponding to signals propagating in a predetermined portion of a mobile telephone network comprising a sector, wherein the signal characteristics include at least two of received signal strength indicator values, an interference matrix comprising a plurality of interference values each representing interference of the sector with a respective plurality of other sectors of the mobile telephone network, and timing advance values,
   receive a first signal propagation prediction corresponding to the predetermined portion of the mobile telephone network,
   modify the first signal propagation prediction to produce a second signal propagation prediction using the signal characteristics,
   use the second signal propagation prediction and a traffic map corresponding to the portion of the mobile telephone network to produce estimated signal characteristics corresponding to the predetermined portion of the mobile telephone network, and
   compare the estimated signal characteristics to the signal characteristics received from the network management system.

* * * * *